(12) United States Patent
Wason

(10) Patent No.: US 8,924,837 B2
(45) Date of Patent: *Dec. 30, 2014

(54) TEXT FILE INTERFACE SUPPORT IN AN OBJECT ORIENTED APPLICATION

(75) Inventor: James Richard Wason, Tuxedo, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

This patent is subject to a terminal disclaimer.

(21) Appl. No.: 12/473,624

(22) Filed: May 28, 2009

(65) Prior Publication Data

US 2009/0235164 A1 Sep. 17, 2009

Related U.S. Application Data

(63) Continuation of application No. 09/616,809, filed on Jul. 14, 2000, now Pat. No. 7,568,152.

(51) Int. Cl.
| | |
|---|---|
| *G06F 17/21* | (2006.01) |
| *G06F 17/24* | (2006.01) |
| *G06F 17/27* | (2006.01) |
| *G06F 17/22* | (2006.01) |

(52) U.S. Cl.
CPC ............ *G06F 17/248* (2013.01); *G06F 17/271* (2013.01); *G06F 17/2229* (2013.01)
USPC ........... 715/200; 715/234; 715/235; 715/236; 715/239; 715/255; 715/256

(58) Field of Classification Search
CPC .......... G06F 17/2247; G06F 17/30893; G06F 17/211; G06F 17/30569; G06F 17/3089; G06F 17/30265; G06F 17/24; G06F 17/21; G06F 17/30896; G06F 17/2229

USPC ......... 715/200, 235, 234, 236, 239, 255, 256; 12/200, 235, 234, 236, 239, 255, 256

See application file for complete search history.

(56) References Cited

U.S. PATENT DOCUMENTS 5,369,508 A * 11/1994 Lech et al. .................... 358/462
5,418,941 A    5/1995 Peters (Continued)

OTHER PUBLICATIONS

Microsoft Press Computer Dictionary, 1997, Microsoft Press, Third edition, pp. 286.

*Primary Examiner* — Adam M Queler
*Assistant Examiner* — Ariel Mercado
(74) *Attorney, Agent, or Firm* — Scully, Scorr, Murphy & Presser, P.C.; Matthew Chung, Esq.

(57) ABSTRACT

A method and system for processing a text file in a computer application. The method comprises the steps of forming a template from fragments of the text file; using the template as an overlay for parsing incoming files, or as a prototype to generate a segment of an output file; and using a macro class to map data from the text file to an application. The macro class is embedded as a keyword within the template, so that when the template reaches the keyword, the template calls the macro class to further process the text file. The macro class may be used to reads in a segment of the text file and to use the segment to initiate application update processing. Also, the macro class may be used to derive data from the application and to format it into the text file. Preferably, an interface controller is provided to prevent structure clashes by placing text data into appropriate places in a complex object structure as the text file is processed.

14 Claims, 4 Drawing Sheets

Processing a Text File in a Computer Application

Forming a template from fragments of the text file.

Using the template as an overlay for parsing incoming files, or as a prototype to generate a segment of an output file.

Using a macro class to map data from the text file to an application.

Embedding the macro class as a keyword within the template, wherein when the template reaches the keyword, the template calls the macro class to further process the text file.

(56) References Cited

U.S. PATENT DOCUMENTS

| | | |
|---|---|---|
| 5,694,608 A | 12/1997 | Shostak |
| 5,832,268 A | 11/1998 | Anderson et al. |
| 5,862,325 A | 1/1999 | Reed et al. |
| 5,903,859 A * | 5/1999 | Stone et al. ............... 704/8 |
| 5,907,837 A | 5/1999 | Ferrel et al. |
| 5,920,725 A | 7/1999 | Ma et al. |
| 5,937,412 A | 8/1999 | Kohli et al. |
| 5,963,205 A | 10/1999 | Sotomayor |
| 6,018,731 A | 1/2000 | Bertrand et al. |
| 6,018,732 A | 1/2000 | Bertrand et al. |
| 6,121,964 A | 9/2000 | Andrew |
| 6,133,917 A | 10/2000 | Feigner et al. |
| 6,199,077 B1 | 3/2001 | Inala et al. |
| 6,237,135 B1 | 5/2001 | Timbol |
| 6,246,404 B1 | 6/2001 | Feigner et al. |
| 6,259,445 B1 | 7/2001 | Hennum et al. |
| 6,262,729 B1 | 7/2001 | Marcos et al. |
| 6,263,339 B1 | 7/2001 | Hirsch |
| 6,279,008 B1 | 8/2001 | Tung Ng et al. |
| 6,298,478 B1 | 10/2001 | Nally et al. |
| 6,301,579 B1 | 10/2001 | Becker |
| 6,317,871 B1 * | 11/2001 | Andrews et al. ............... 717/137 |
| 6,338,059 B1 | 1/2002 | Fields et al. |
| 6,342,907 B1 | 1/2002 | Petty et al. |
| RE37,722 E | 5/2002 | Burnard et al. |
| 6,415,307 B2 * | 7/2002 | Jones et al. ............... 715/202 |
| 6,424,980 B1 * | 7/2002 | Iizuka et al. ............... 715/206 |
| 6,429,882 B1 | 8/2002 | Abdelnur et al. |
| 6,490,601 B1 | 12/2002 | Markus et al. |
| 6,553,563 B2 | 4/2003 | Ambrose et al. |
| 6,591,272 B1 | 7/2003 | Williams |
| 6,605,120 B1 | 8/2003 | Fields et al. |
| 6,684,438 B2 | 2/2004 | Brodersen et al. |
| 6,721,740 B1 | 4/2004 | Skinner et al. |
| 6,850,922 B1 | 2/2005 | Wason |
| 6,857,103 B1 | 2/2005 | Wason |
| 6,912,692 B1 * | 6/2005 | Pappas ............... 715/762 |
| 6,931,420 B1 * | 8/2005 | Silvester et al. ............... 1/1 |
| 6,938,260 B1 | 8/2005 | Wason |
| 7,086,067 B1 | 8/2006 | Wason |
| 7,568,152 B1 | 7/2009 | Wason |
| 2002/0049833 A1 | 4/2002 | Kikinis |
| 2003/0188262 A1 | 10/2003 | Maxwell et al. |
| 2006/0070088 A1 | 3/2006 | Wason |

* cited by examiner

Processing a Text File in a Computer Application

Forming a template from fragments of the text file.

Using the template as an overlay for parsing incoming files, or as a prototype to generate a segment of an output file.

Using a macro class to map data from the text file to an application.

Embedding the macro class as a keyword within the template, wherein when the template reaches the keyword, the template calls the macro class to further process the text file.

Figure 1

1. Templates that support variable substitution and conditional or iterative generation for output files.

2. A mechanism to fill in variable substitutions in the templates.

3. A mechanism to handle iterations and conditional processing.

4. A flexible template processing mechanism which operates within an object oriented environment.

5. A flexible and easily extended formatting mechanism for output.

6. A mechanism for template creation and editing.

7. Special support for complex object presentation.

8. Templates that support parsing of the input file and mapping of its contents into a complex object structure suitable for update processing.

9. A mechanism to extract data from the input stream.

10. A mechanism to map the structure of the input file into a complex object structure suitable for internal processing.

11. A mechanism to organize the updating data from the input file and to apply it within the application.

12. A flexible and easily extended formatting mechanism.

13. A mechanism for input template creation and editing.

Figure 2

MACRO CLASSES

| INPUT MACROS | OUTPUT MACROS |
|---|---|
| Read in a segment of the text file and use said read in segment to initiate update processing of the computer application | Derive data from the computer application and format the derived data into the text file |

Figure 4

TEXT FILE INTERFACE SUPPORT IN AN OBJECT ORIENTED APPLICATION

CROSS REFERENCE TO RELATED APPLICATIONS

This application is a continuation of copending application Ser. No. 09/616,809, filed Jul. 14, 2000, the disclosure of which is hereby incorporated by reference in its entirety.

The disclosure of this application is related to the disclosures of the following copending applications:

"Business Logic Support," Ser. No. 09/616,800, filed Jul. 14, 2000, now U.S. Pat. No. 6,850,922; "Flexible Help Support In An Object Oriented Application," Ser. No. 09/616,808, filed Jul. 14, 2000, now U.S. Pat. No. 6,857,103; "Dynamic Java Beans For VisualAge For Java," Ser. No. 09/615,973, filed, Jul. 14, 2000, now U.S. Pat. No. 7,086,067; and "Complex Data Navigation, Manipulation And Presentation Support," Ser. No. 09/615,976, filed Jul. 14, 2000, now U.S. Pat. No. 6,938,260; the disclosures of the four above-identified copending applications are hereby incorporated herein by reference in their entireties.

BACKGROUND OF THE INVENTION

This invention generally relates to text file processing, More specifically, the invention relates to methods and systems for processing text files used to communicate between applications or between an application and an end user.

Much of the communication between applications or from an application to an end user is in the form of text files. Examples are the traditional batch interface files that many "legacy" applications still use, and more contemporary formats such as html, xml and rtf. The latter are examples that indicate that text file interfaces will be with us for a long time.

The problem is that dealing with these files requires a great deal of application logic to parse the incoming text file and do something with the content, or to assemble application data and format it into an appropriate configuration.

There are three basic problems in text file processing. The first is how to describe and program for the structure of the text file. The second is how to achieve a mapping of data between the text file and the application (note that it assumed here that the application has some independent means, in this case EADP, of moving the data from some stored format such as a database). Inherit in this is the third problem: describing the flow of control needed to process the file. The structure of the text file inherently describes the sequence of processing needed to process it; however, organizing this structure into application logic is often a major source of application programming.

SUMMARY OF THE INVENTION

An object of the present invention is to improve text file processing. Another object of this invention is to provide an improved text file interface support in an object oriented application.

A further object of the present invention is to handle the problems of pattern matching and flow of control, in text file processing, by creating a structure of templates and macros that correspond to the structure of the text file to be processed.

These and other objects are attained with a method and system for processing a text file in a computer application. The method comprises the steps of forming a template from fragments of the text file; using the template as an overlay for parsing incoming files, or as a prototype to generate a segment of an output file; and using a macro class to map data from the text file to an application. The macro class is embedded as a keyword within the template, so that when the template reaches the keyword, the template calls the macro class to further process the text file.

The macro class may be used to read in a segment of the text file and to use the segment to initiate application update processing. Also, the macro class may be used to derive data from the application and to format it into the text file. Preferably, an interface controller is provided to prevent structure clashes by placing text data into appropriate places in a complex object structure as the text file is processed.

This invention is a general solution; so it is not about techniques to produce a specific format (e.g. object serialization or IP format). The only limitations on the text format is that it is possible to describe and predict a mapping from the text form of the data to its application form. Another point that should be noted is that although the application data may be represented by objects, the characteristics of data organization need to process the text files may be completely different.

Since the preferred embodiment of this invention is based on the underlying facilities of the Enterprise Application Development Platform (the copending application "Complex Object Navigation, Manipulation and Presentation" provides a base description), there is an assumption that the application data is of a form that is amenable to EADP control—that it includes complex object structures and probably some normalized data that can be manipulated using EADP functions.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 1 is a flow chart outlining a method embodying this invention.

FIG. 2 shows major features of a preferred embodiment of the invention.

FIG. 4 shows an input macro and an output macro of macro classes used in embodiments of the inventor.

DETAILED DESCRIPTION OF THE PREFERRED EMBODIMENTS

Figure 3:
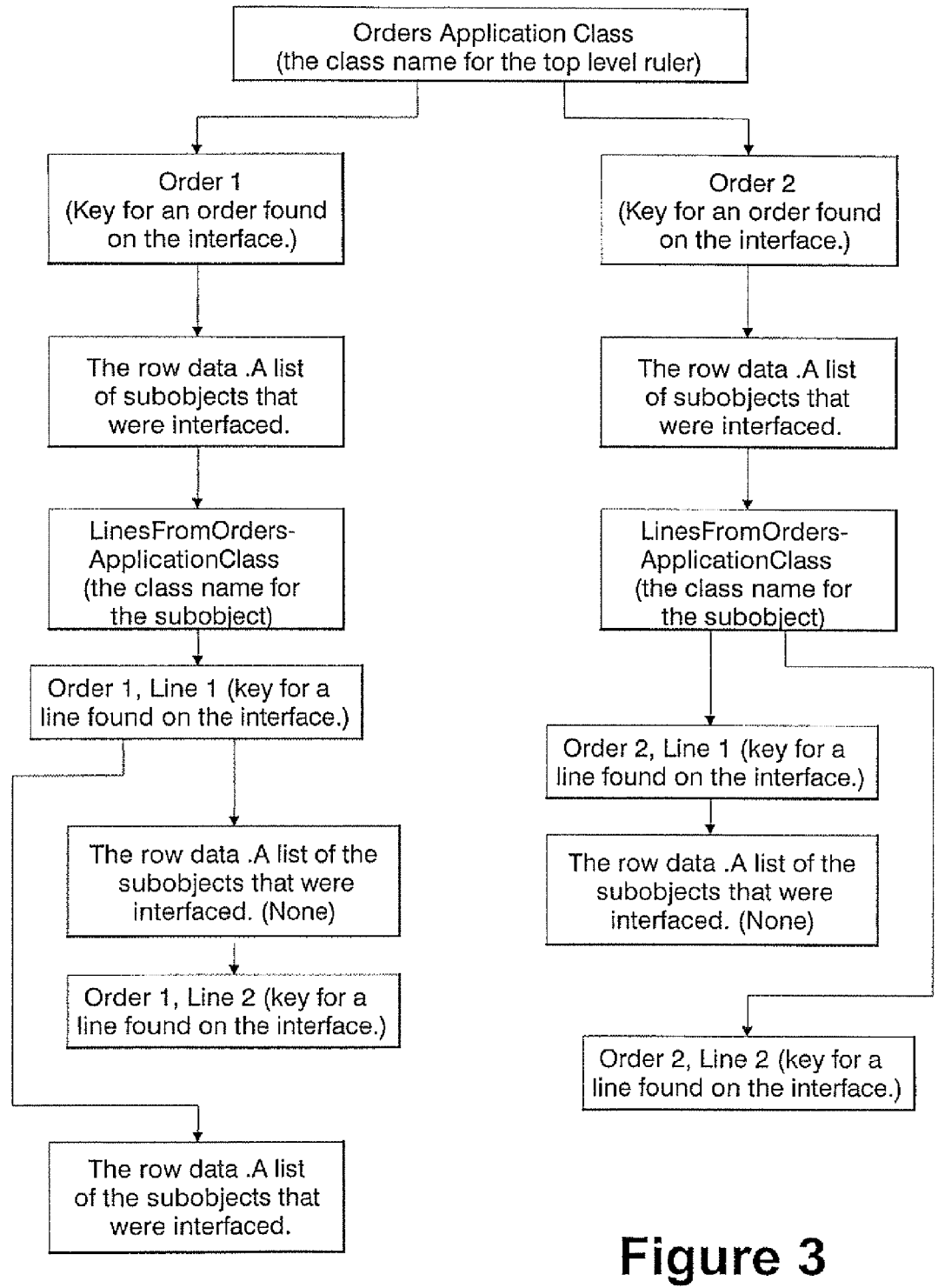
FIG. 3 is a flow chart illustrating an aspect of an embodiment of the invention.

As mentioned above, there are three basic problems in text file processing. The first is how to describe and program for the structure of the text file. The second is how to achieve a mapping of data between the text file and the application (note that it assumed here that the application has some independent means, for example EADP, of moving the data from some stored format such as a database). Inherent in this is the third problem: describing the flow of control needed to process the file. The structure of the text file inherently describes the sequence of processing needed to process it; however, organizing this structure into application logic is often a major source of application programming.

As generally outlined in FIG. 1, the present invention effectively addresses each of these problems. More specifically, this invention solves the first problem, describing the text format, by using fragments of text (templates) as overlays for parsing incoming files, or as prototypes to generate segments of output files. There are several important advantages to this approach. The templates are isolated from all other application logic, so it is easy to see why a particular template is producing a resulting text file. The template is a literal image of the text fragment it processes, so it is possible to create the templates from samples of the text file. If the format changes, it is easy to change the corresponding template. For incoming files, there is an important advantage to being able to use a template as a mask to parse the text file. This replaces hard to decipher application logic typically used for parsing.

The second problem of mapping data from the text file to the application is solved by specialized macro classes. These come in two flavors (one for input and one for output). The input macro (shown in FIG. 4) read in a segment of the text file and use it to initiate application update processing. The output macros (shown in FIG. 4) derive data from the application and format it into the text file (special format classes are used to describe how to transform the output into the proper shape). This invention provides a basic set of macros, and the facilities to add more as needed.

The solution to the third problem, flow of control, is solved by the interaction of templates and macros. A macro is embedded as a special keyword within a template. When the template reaches that point, it calls the macro. The macro in turn is passed another template name as part of its invocation; as a part of its processing it can invoke that template (which in turn calls other macros, etc.). This nested aggregation of templates and macros allows a processing structure to be built up that mirrors the inherit structure of the text file. Since the behavior of the macro depends both on its internal logic and the template it is passed to invoke, it is possible to reuse the same macro to do different things by passing it a different template. The net effect is that the bulk of the logic needed to describe flow of control is included in the template structure. The template/macro combination is the ultimate expression of the ideal of letting the target file structure determine the structure of the application needed to process it.

The above procedures may produce "structure clashes"; this is a fourth problem that needs to be solved within this context, particularly for incoming text files which must be mapped to application data.

This invention includes an interface controller which sets up a temporary complex object structure in memory. The interface macros pigeonhole data into appropriate places in the structure as the text file is processed. After the entire file is processed, the internal structure is used to process updating data into the application. This master processing module can be used for any EADP compliant application, as can the base interface macros that are provided as part of this invention. The great advantage here is that processing a new batch interface for a new application becomes mostly a matter of setting up the template structure to map out the text file. The macro processing and the base application processing are already in place.

With reference to FIG. 2, the preferred embodiment of this invention includes the following major features.

1. Templates that support variable substitution and conditional or iterative generation for output files;
2. A mechanism to fill in variable substitutions in the templates;
3. A mechanism to handle iterations and conditional processing;
4. A flexible template processing mechanism which operates within an object oriented environment;
5. A flexible and easily extended formatting mechanism for output;
6. A mechanism for template creation and editing;
7. Special support for complex object presentation;
8. Templates that support parsing of the input file and mapping of its contents into a complex object structure suitable for update processing;
9. A mechanism to extract data from the input stream;
10. A mechanism to map the structure of the input file into a complex object structure suitable for internal processing;
11. A mechanism to organize the updating data from the input file and to apply it within the application;
12. A flexible and easily extended formatting mechanism; and
13. A mechanism for input template creation and editing.

1. Templates that support variable substitution and conditional or iterative generation for output files.

The templates are fragments of text that include the literals for the output text stream. These capture the predictable pattern of the output stream. Each template may include substitution points, which are to be filled in with application data, or calls to macros to perform conditional or iterative processing.

2. A mechanism to fill in variable substitutions in the templates.

A simple variable substitution in the template is indicated by a tag name enclosed by dollar signs. When the template is processed, a Java Hashtable is prepared with the tag names and substitution variables. These are matched against the tag names in the template as the output text stream is created.

3. A mechanism to handle iterations and conditional processing.

The name of a Java class can be used as a substitution variable. If a class name is used, the "macro" method on that class is invoked (it is passed other information which can be included in the substitution variable, such as the name of the next template to process). Iterations, conditional logic, and the preparation of data for the next template is handled by these "macro" classes.

4. A flexible template processing mechanism which operates within an object oriented environment.

There are two aspects to this.

a. "Macro" classes which all inherit from a common class that defines the "macro" method. There are two base macro classes (one for input and one for output). An interface controller keeps track of the macros needed for a particular process so that they do not need to be continually reinvoked using Class.forName.

b. Java classes which controls template processing. The class for output processing handles functions such as parsing the templates to find substitution variables, resolving the substitutions, and invoking macro classes as indicated in the substitution variables. The class for input processing handles functions such as parsing the templates to find keywords, synchronizing the templates with the input file, preparing a memory structure with the updates, and then applying the updates to the database.

5. A flexible and easily extended formatting mechanism for output.

Much of the format of the output stream is determined by the literal text within the templates themselves. In addition, the name of a formatting class can be included in the variable substitution name. These formatting classes all inherit from a common class which defines the "format" method. This method can be redefined to do any specialized formatting required for that substitution variable in that template. Of course, the same formatting class can be reused in other places.

6. A mechanism for template creation and editing.

The templates for each application are stored as a Hashtable that is associated to that application's definition class (as described in copending application Complex Object Navigation, Presentation and Manipulation). The template editor is implemented as a Java bean custom editor.

7. Special support for complex object presentation.

A specialized macro is provided which supports the navigation of a complex object structure. This means that only the templates need to be provided to give different types of reports or batch interfaces based on the data in the database underlying the complex object structure.

8. Templates that support parsing of the input file and mapping of its contents into a complex object structure suitable for update processing.

The templates are fragments of text that include the literals for the input text stream. These capture the predictable pattern of the input stream. Each template includes macros which specify points in the input stream from which data is to be taken (and what to do with that data). The macros can also specify that the field is of a fixed length, so that that number of bytes is automatically advanced in the stream.

9. A mechanism to extract data from the input stream.

An extraction point in the template is indicated by a keyword (a set of characters enclosed by dollar signs). Parameters within the keyword are separated by commas. The first parameter is the name of a macro class. However, the macros used for interface process implement a macro method with slightly different parameters, as described below. The additional parameters give information such as the name of the field to be extracted, which database table it belongs to in the current application, and possibly the length of the input field. Two strategies to recognize the boundaries of the input fields are supported:

a. Some input files use separators between fields and the fields have variable lengths. In this case the separator would be a literal in the template.

b. Others use fixed length fields with no separators. In this case the length of the field is specified in the keyword.

10. A mechanism to map the structure of the input file into a complex object structure suitable for internal processing.

The complex object structure of the target application is defined using the customization mechanisms described in copending application Complex Object Navigation, Presentation and Manipulation, Each keyword in the template used for data extraction specifies the column name and the internal class name for the data to be extracted (specialized keywords can be constructed to assign the same data to more than one table or column). This allows a rapid and simple way to map the contents of the input file onto the internal structure of the application. It also gives considerable flexibility, since the contents of one interface record may be reorganized to map to several internal classes (and thus different tables in the target database) or vice versa.

11. A mechanism to organize the updating data from the input file and to apply it within the application.

This invention takes advantage of the customization facilities described in copending application Complex Object Navigation, Presentation and Manipulation. That invention shows how each database table is associated to an "internal class" that controls updates to that table. The parsing information within the template specifies for each field which internal class it should be assigned to, and the database column name for the field. A memory structure is created to organize this data by internal class and by key data. Within this structure, the internal classes are organized by complex object structure. When the updates are applied to the database, this is done using the same methods that apply data interactively. The complex object structure is followed, so that rulers are updated before subobjects. All the data for subobjects is linked in memory to the data for the ruler, so that if the ruler update fails, update of its associated subobjects can be avoided.

12. A flexible and easily extended formatting mechanism.

This is similar to the formatting strategy for output files, but in reverse. The format class is used to translate the string data from the input field into a suitable format for internal processing. This can include such things as skipping quotes or extra blank in the input file.

13. A mechanism for input template creation and editing.

The Java implementation adds an interfaceDictionary property to the EADPTemplateDefinition class as a place to define the interfaceTemplates for a particular application. This is then customized for the database definition class for a particular database. The templates for that database are used when an interface for that database is processed.

Each record in the interface file must be matched to a unique template. The type of input record for the template can be specified in two ways:

a. The template name can start with a table name. This table name is then specified when the interface file is processed. Only templates that begin with this name will be used.

b. If the record has an identification symbol at the beginning of the record, this can be used to qualify the name of the template used to parse that record. This is useful when the interface file has a mix of record types. An asterisk in the template name indicates that it can be used for any record in the interface file.

The discussion below describes in greater detail several of the above-mentioned features of the preferred embodiment of the invention.

Output Text Generation

1. Template Definition

The syntax of templates is kept very simple so that templates can be easily created from samples of the target output format. A template is a piece of text with imbedded keywords. The keywords are delimited by dollar signs. For example: text1 . . . $keyword1$ text2 . . . $keyword2$ . . . etc.

A template can span multiple lines of text. However, a special keyword $+$ at the end of a line indicates that a new line character should not be added when the template is processed. When a template is processed, the text outside the keyword is passed along as is into the output stream. The text inside a keyword is evaluated according to the following rules:

a. The text up to the first comma is checked to see if it matches the name of a VisualAge class. If it does, the "macro" method of that class is invoked. The remainder of the text within the keyword (after the comma, up to the dollar sign) is passed as a parameter to the macro method. It is then passed to the receiving method (additional commas may be used to separate information).

For example, the receiving macro can be passed the name of the next template to process using this technique. This is useful when the output stream requires a nested sequence of templates and macros (for example, a report of purchase orders and line items for each purchase order).

b. If the first part of the text is not the name of a class, it should match the name of a variable in the substitution list which was prepared for use by the template when it was invoked. In this case, any text after the comma is assumed to be formatting information:

i. The first piece is the name of the class which will do the formatting (for example PadRightFormat). If this is omitted, no special formatting is done. The data appears just as it would on the list or entry panels.

ii. If there is more data (delimited by a second comma) this is passed to the formatting class. For example, the length of the field is passed to PadRightFormat.

2. Resolution of Variable Substitutions in the Templates.

When each template is processed, it is presented a Java Hashtable which has as keys the names of the variables (matching the variables names specified within the template). The values are substituted into the template (they may be modified by the specified formatting routine). The variable substitutions are prepared by macros prior to template invocation.

3. A Mechanism to Handle Iterations and Conditional Processing.

This invention avoids creating another programming language by adding logic constructs within the template itself. The only branch to logical processing is through invocation of macros, which are coded in Java (and can take advantage of the full power of that environment).

Since templates can invoke macros and macros can in turn invoke templates a recursive chain of macros and templates can be used to handle nested structures within the output stream (for example, reporting orders, and within each order, all the line items for that order).

4. Macro Classes

Macro classes all inherit from a common class, com.ibm.eadp.macros.EADPMacroBase, and redefine the instance method macro. The parameters passed are as follows:

a. Segment

The macro was invoked from with a template because the keyword (text within dollar signs) contained the name of the macro. There may be other text after the macro name, and this is passed as the segment parameter. The various pieces of information in the keyword are separated by commas. Information that is commonly included here is the name of the template the macro should use for its processing. This allows reuse of the same macro to process different templates.

b. currentClass

This is a reference to an instance of a Java class. Messages can be sent to that class to derive data to populate the variable list.

c. varList

This is the variable list (Hashtable) that was presented to the calling template. Data from it may be used by the macro to build its own variable list.

d. outStream

This is the output stream for the text stream that is to be generated (of type StringWriter).

In addition, the macro class has as a property the current controller, which is the instance of EADPTemplateController that is processing the templates (and which invoked that macro).

5. A Java Class which Controls Template Processing.

Template processing is controlled by com.ibm.eadp.macros.EADPTemplateController. It is expected that when a new instance of controller is created, it will be assigned a data base definition class (a child of EADPDatabaseDefinition as defined in Complex Object Navigation, Presentation and Manipulation). EADPDatabaseDefinition has an additional property, templatedefinition, of type com.ibm.eadp.macros.EADPTemplateDefinition. This in turn has two properties, interfaceDictionary and templateDictionary, both of type com.ibm.eadp.macros.EADPTemplateDictionary. This class is a child of Hashtable (redefined to give it a custom editor).

When a new instance of EADPTemplateController is created to be used for processing, it is assigned a database definition class (this gives it access to the database) and a template dictionary (typically the templateDictionary property of the templateDefinition for the database definition).

Some Methods:

a. getTemplateDictionary

This method returns the property that was assigned when the instance of controller was created. This is a Java Hashtable that has as its keys the template name, and values the template strings.

b. processTemplate (templateName, currentClass, outStream, varList)

This is the first method invoked in template processing. The first parameter passed is the name of the template. This is used as a key against the template dictionary, and the resulting text (along with the other parameters) is passed to processText.

c. processText (text, currentclass, outStream, varList)

This method breaks the text up into lines and passes each line to processSegment. The EADPStringReader is used for parsing support. EADPStringReader implements the upTo (aString) and upToEnd methods, which are equivalent to the upTo: and upToEnd methods supported by the ReadStream class in Smalltalk.

d. processSegment (Segment, currentClass, outStream, varList)

This method parses each line for keywords (delimited by dollar signs). Any text outside a keyword is appended as is to the output stream. Any text within a keyword is passed as the first parameter to processKeyword.

e. processKeyword (Keyword, currentClass, outStream, varList)

This method parses out the various pieces of information stored in the keyword (these are separated by commas). The first segment is either the name of a macro class, or the key of a variable substitution to be found on the varList. If the segment is a macro name, the macro (trailer, currentclass, outStream, varList) method on the macro class is invoked (passing the remainder of the keyword as the first parameter). The resolution of the name of the macro class requires more care in the Java environment. This is encapsulated in the macroForName method in the controller class. In order to avoid repeated calls to instantiate the same macro class, a cache of ones that have been used already is kept (all macro methods need to be reentrant to support this). This cache is a Hashtable keyed by the macro name. If the macro is not in the cache, the macroForName method on the database definition class that was assigned to the controller is called. The name of the macro that is passed does not include the package name; the macroForName method use Class.forName, first with the package name com.ibm.eadp.macros, then with its own packaged name (this allows each application to add specialized macros to extend the support provided by this invention).

If the segment is not a macro name, the processVariable method is invoked (passing the segment as the first parameter and the remainder of the keyword as the second parameter f. processVariable (Segment, Format, outStream, varList).

This method has as its first parameter the key for the variable substitution. This is used to find the value in the varList, which is a dictionary containing the variable substitutions to be used when processing the template.

The second parameter contains formatting information (separated by commas). The first segment is the name of the formatting class. The remainder is passed as the "pattern" to the format method on the formatting class. If there is no formatting information specified (the format parameter is a null string), the EADPBasicFormat class is used. Format classes are resolved using the same strategy as the macro classes (and formatForName methods).

6. A Flexible and Easily Extended Formatting Mechanism.

All formatting classes inherit from com.ibm.eadp.macros.EADPBasicFormat class and redefine the format (string, pattern, outStream) method. The first parameter here is the string to be formatted. The second parameter may contain additional formatting instructions, separated by commas (each child would add its own logic to parse the formatting instructions). The formatted result is appended to the passed outStream.

The base method just appends the passed string to the outStream without any additional formatting.

7. A Mechanism for Template Creation and Editing.

Template definition is provided as a Java bean customization of the EADPTemplateDictionary. The customization follows There is an EADPTemplateDictionaryEditor which inherits from java.beans.PropertyEditorSupport, and EADPTemplateDictionaryDisplay which is the custom editor.

Templates for an application are edited by customizing the database definition class (child of EADPDatabaseDefintion) for that application. As was noted above, this has a new property, templateDefintion. To customize, in the VisualAge visual editor, a bean of type EADPTemplateDefinition must be added to the visual surface, and attached to the templateDefinition property. The property sheet for the bean then shows two features, interfaceDictionary and templateDictionary, which can be customized (both are of type EADPTemplateDictionary, so they bring up the same type of custom editor).

The custom editor (EADPTemplateDictionaryDisplay) has a list of the current keys for the dictionary, an entry field to define a new key name, and a text area to enter the template text. Buttons to update or delete the template are provided, along with buttons to read and write the text body from a file (this allows the templates to be exported or imported).

The EADPTextHelper class defines the readTextFromFile and writeTextToFile methods. These methods are connected to the open file and save file buttons. Standard file dialog beans (java.awt.FileDialog) are used find directory and file names.

The technique to create the Java initialization string and to initialize the string is similar to the one described in the above-identified copending application "Flexible Help Support In An Object Oriented Application." Only two separators are needed (for the key and text of each template). New line markers are added to the generated string at each line of the template so that the generated code is readable; an extra new line marker is also added within the initialization string for each template line so that the initialized text has the proper line breaks.

8. Special Support for Complex Object Presentation.

When a macro is processed, the remaining information in the keyword is passed as the first parameter. The macros described here expected the keyword to contain the name of the internal class (as defined by the above-identified copending application "Complex Data Navigation, Manipulation And Presentation Support For VisualAge Java") and the name of the next template to process. The "current class" would be an instance of the ruler class (for example, the ruler class would be for orders and the name of the class in the keyword would indicate line items for that order). The macro classes have a currentController property which is assigned by macroForName as the macro instance is created. This instance is the one that gets the processTemplate call.

The ReportMacro class redefines the macro method. As mentioned above, the first parameter should contain a string which has the next internal class name and the next template name, separated by commas. The current class should be an instance of a child of EADPApplicationClass. For the first level, the class name of a top object can be passed, along with an the database definition class for the process. If this is done, the managerForName method on EADPDatabaseDefinition is used to find an instance of the class. Otherwise, an instance of a child of EADPApplicationClass (the ruler class) is passed as the current class, and its subManager method is used to find the subobject class (using the current row of the ruler class as the ruler row).

The class name and template name are parsed out of the first parameter. If the class name matches the name of the current class (this would be true for the first level of the process), the current row of the current class (as the first parameter) and the current class (as the second parameter) are passed to the processRow (row, class, template, outSream, varList) method. Otherwise, a new instance of the type of class indicated by the class name is created (this should be subobject of the current class) and is assigned the current class as a ruler. The current row of the current class is used to open the subobject class (this finds all the subobject rows that match the current row of the ruler, e.g. all lines for a particular order). For each row of the subobject class, the processRow method is called (passing the subobject class as the second parameter). In both cases, the template name parsed from the keyword, and the passed varList and outStream are passed as the additional parameters.

The processRow method copies the passed varList into a new dictionary, and the uses the row dictionary for the passed row to add additional entries. The values in the row dictionary are converted to string format using the getStringValue method on EADPPersistentObject, which does the property editor lookup to format the string value. The processTemplate method on TemplateMetaclass is then called, passing the template name, the class (which is now the subobject class), and the new variable list. Combined with a set of templates that call out various pieces of the complex object structure and provide formatting information, this allows navigation down through the levels of the complex object.

Input Text Processing

All methods are instance methods. To avoid creating many instances of the same macro class, the classes are cached and reused. The setStringValue method on EADPPersistentObject is used to convert the data from string format to internal format, and this is done as the data is applied to the database. Before that, all data is held in string format. The setStringMethod uses the editor dictionary for the row's data manager to find the right property editor to convert the value to object format.

One difference with the data update function described in the above-identified copending application "Complex Data Navigation, Manipulation And Presentation Support For VisualAge Java," is the way a prototype for a new row is created. In the function described in the above-identified copending application "Complex Data Navigation, Manipulation And Presentation Support For VisualAge Java", a new row is being added to rows for a result set that has already been created, so that the metadata for the result set can be used to determine the data type for the columns. Here, a new row has to be defined before a query has been issued, so database metadata has to be used. Since this is an expensive call, and a typical interface will not involve many different types of rows, the results are saved and reused.

Several classes and methods are described below:

1. EADPInterfaceView

This defines the visual part used to process a batch interface file. It is customized to provide an interface view for a particular application by customizing its database definition property. This class inherits from Panel, and it designed to be included as a visual bean in the interface view for a particular application.

It has the following features.

a. Table name text area

This is used to specify the table name prefix.

b. Text area for the interface file

The interface file is presented in a text area which allows editing. This can be useful when the file that is sent to be processed has header and trailer records which are not needed as it is being processed. They can be stripped off manually before the interface is processed.

c. File handling beans and buttons.

The EADPTextHelper class defines the readTextFromFile and writeTextToFile methods. These methods are connected to the Open File and Save File buttons. Standard file dialog beans (java.awt.FileDialog) are used find directory and file names.

d. Continuation

This text area is used to specify a continuation character which may be used by the interface templates.

e. processInterface

This method is invoked when the Process Interface button is pressed. The parameters passed are the interface file, the table name, and the continuation character. To begin processing, a new instance of EAPDInterfaceController is created, and it is assigned the database definition property as its database definition. The interfaceDictionary property of the templateDefinition property of the database definition is assigned to the templateDictionary property of the controller (this is how the controller knows which templates to look for). The datastore property of the database definition is used to connect to the database. Next, the processInterface method on EADPInterfaceController is called to parse the interface and apply the changes.

f. currentDefinition Property

This property is set to the database definition for the application when the visual bean is customized. This is how the Java version knows which database to process. The database definition class also has the connection information that is needed to establish a connection to the database to begin processing.

2. EADPInterfaceController

This class has methods that process the interface file.

a. processInterface

This is passed the interface file (as a String), the table name, and the continuation character This method controls the interface processing. It creates a Hashtable (the processDictionary) which acts as a storage area in memory for the updating data. This dictionary is passed as a parameter to all the methods (including macros) that are used to process the interface file.

The first step is to break the interface file into records. The continuation character is used to combine lines from the input file into logical records. For each record, the matching template is determined by calling the templateForSegment method. The record and its associated template are then passed to processTemplate method.

Once the entire interface has been processed, the updates are applied by calling the doApply method. This iterates through the process dictionary and calls apply.

b. templateForSegment

This method is passed the current line of the interface file and the table name specified as the interface was initiated.

It finds the template that will be used to parse the current record. It uses the templateDictionary property (assigned as the controller was initiated) to locate the dictionary of templates for the current application. It then iterates through the keys of the dictionary, looking for ones that start with the passed table name. If a match is found, it then checks the remainder of the key. If it is an asterisk, the template is used without checking it against the input record (an asterisk indicates that the template is to be used for all records for that table type). Otherwise, the remainder of the template name is checked to see if it matches the beginning of the record (this is used if the records start with flags that indicate the record type). The template is then returned to the caller.

c. processTemplate

The parameters passed in are the template that was found as described above, the current record of the interface, and the processDictionary.

This method first creates a scratch pad entry in the dictionary for holding the processing results for the current row. This is a new dictionary added at the key value 'currentRow' (the processDictionary is a nested set of dictionaries, so most of its entries are other Hashtables). This will be referred to as the currentRow dictionary.

Next, the template is broken up into individual lines (for convenience, the template may consist of multiple lines. This allows each field of the record to be described by a line of the template, which makes it easier to describe and understand the record structure. Typically any existing documentation of the record structure will have this format, and this makes it easier to convert that documentation into a template to process the record.

For each line of the template, the processSegment method is called. This will create entries in the currentRow dictionary.

Once all the lines have been processed, the updateDictionary method is called (passing the processDictionary). This will move entries from the "currentRow" dictionary to their final position in the memory structure.

d. processSegment

The parameters passed in are the current line of the template that was found as described above, the current record of the interface, and the processDictionary.

This method finds a keyword in the passed line of the template by looking for text enclosed by dollar signs. The fragment of text between this and the next keyword is then found (this is the trailer). These are passed to processKeyword.

Next, the method looks for any characters outside dollar signs, and advances the position in the interface record to match those characters (the upTo method in EADP StringReader is optimized to do this). This is how separator characters in the interface record are described in the template. The separator is included as literal text after the extraction keyword.

This process continues until the end of the template line is reached.

e. processKeyword

The passed parameters are the keyword, the fragment of template after that keyword, the interface record, and the processDictionary. The macro name is parsed from the keyword (it is separated from the rest of the keyword by a comma), and is used to find the macro class. The macro method is called on the macro class. Typically, the EADPColumnInterfaceMacro would be called at this point. However, in some cases the same column data needs to be used in several places (for example, a row in the input may correspond to both a ruler and subobject in the target application if the source application was not well structured).

f. Macro (Keyword, Trailer, Segment, Dictionary) Method in EADPColumnInterfaceMacro This method will be described now to make it easier to understand the flow of control. Keep in mind that other similar macros could have been invoked at this point (for example, the EADPTwoColumnInterface which places the same column data into two different internal classes). The macro invocation is determined by the placement of the macro name in the template, so the template structure is driving the flow of control at this point.

The parameters passed are the remainder of the keyword (which contains parameter information for the macro), the fragment of the template line between this keyword and the next one, the current interface record, and the processDictionary.

The following parameters are contained in the remainder of the keyword, separated by commas:

1. Internal class name

The name of the internal class to process the update. This may be omitted, if a keyword specifying a standard internal class for the template has been provided (this is done using the EADPTableType macro).

2. Column name

The database name for the column

3. Format

This is the name of the formatting class that will be used to convert the data before it is used. If omitted, the default class EADPInterfaceFormat is used.

4. Format pattern

If provided, this contains additional parameters for the formatting class.

5. Length

If length is included, it is used to determine how much of the input record to read in to get the column data.

If length is provided, it is used to extract that number of bytes from the interface record. Otherwise, the input record up to the trailer fragment is extracted. In both cases, the current position of the interface record is used as the starting point.

If length was provided, that information is used to advance the current position in the interface record.

The data extracted from the interface record is passed to the format method of the formatting class.

Once the data has been extracted and formatted, it is placed into the memory structure defined by the passed processDictionary. The dictionary entry at the key "currentRow" is accessed. This as a dictionary keyed by the name of the internal class used to hold the data. The entry for the internal class passed in the keyword is found (if none is present, one is created). This entry is a dictionary that holds data for the row (the keys are the column names). The column name passed as a parameter in the keyword is used to add the data just extracted from the interface record. The values are stored in string format (they are converted later during processing in the apply method).

g. updateDictionary

This method moves rows from the "currentRow" dictionary to their permanent position. To find the permanent position, the key for the row needs to be known (this is why this process is delayed until the entire template has been processed against the interface record. The key columns may be positioned anywhere within the interface record, so the entire record needs to be parsed before it can be classified).

The method iterates over the entries in the currentRow dictionary. The keys are internal class names, and the values are row descriptions (dictionaries of column names and values). These entries are passed to the hasKeys method to determine if the key columns were found. If so, the addRowToMaster method is called to place the row data in the proper place in the memory structure.

h. hasKeys

This method is passed a key and value from the currentRows dictionary. The key is the name of an internal class. That is used to find the complex object node (EADPComplexObjectNode) for that class in the classDirectory property of the complexObjectStructure property of the currentDirectory property of the database definition (this is encapsulated in the nodeForName method in EADPDatabaseDefinition). The keyCols property of the complex object node is then used to make sure that each has a corresponding entry in the passed value (which is a dictionary of column values keyed by column name).

i. addRowToMaster

This method is passed a key and value from the currentRows dictionary. The key is the name of an internal class. The passed value is a dictionary of column values keyed by column name.

The master dictionary structure is a set of nested dictionaries. It follows the complex object structure, with each instance of a ruler object controlling lower level dictionaries of its subobjects. To achieve this, a two level nesting of keys is used. This first level key is the name of the internal class. The second level is the key information for a particular instance of that class (this is stored as a Vector of the string values for the key in the same order as the keyCols attribute that was used to set it up). For example, if the complex object structure consists of orders and line items, the master dictionary structure might look as shown in FIG. 3.

To accommodate this structure, a node class EADPInterfaceNode is used. It consists of two attributes, rowDictionary the dictionary of column values for the row, and subobjectDictionary, a dictionary of EADPInterfaceNodes keyed by the subobject class names.

The dictForRow method is used to find the proper position within this structure. This positions to the entries for the internal class that are underneath the rulers specified by the key information for the row. Next, a check is made to see if there is an entry for key data matching the current row. If not, a new entry is created. The row data at the entry is then updated with data from the passed row value dictionary.

j. dictForRow

The parameters are the row dictionary, the internal class for the row, and the processDictionary.

This method calls the rulersForClass method to build a Vector of EADPComplexObject nodes for the rulers for the internal class. It then iterates through the Vector. To begin the iteration, the current dictionary is set to the processDictionary, and the current class is set to the first entry in the ordered collection (the top level ruler).

1. The current class name is used as a key in the current dictionary. The corresponding value is a "row key dictionary" of instances of EADPInterfaceNodes, keyed by the key values for instances of the current class (for example, if the top level is Orders, these would be keyed by the order number).

If there is no entry at the key, a new dictionary is created.

2. Once the row key dictionary has been found, the key for the current class (derived from the values in the passed parameter for row data) is used to find an entry that matches the key values for the row being stored. The entry will be an instance of EADPInterfaceNode. If none is found, a new entry is created.

3. The current dictionary is set to the subobjectDictionary attribute of the EADPInterfaceNode.

4. The current class is advanced to the next entry in the Vector.

When this iteration completes, the current dictionary will be set to the subobjectDictionary attribute of the EADPInterfaceNode for the immediate ruler of the passed parameters (it will remain at the main dictionary if the passed internal class had no rulers).

k. doApply

This method is called after the interface has been read into the internal memory structure. It is passed the processDictionary. It makes the initial calls to apply. The entries in the processDictionary are passed (the key is passed as the internal class name and the value is the dictionary of interface nodes). At this level, the passed ruler class and ruler node are null.

l. apply

The passed parameters are the name of an internal class, a dictionary of EADPInterfaceNode instances, the ruler class, and the ruler row.

The method invokes itself recursively to work down through the nested structure of dictionaries and interface nodes. At each level it iterates through the dictionary values. Each entry is an EADPInterfaceNode. The rowDictionary attribute holds updating information. An instance of the data manager for the internal class is created using the internal class name. If the passed ruler class is null, the managerForName method on the definition class is used. If the ruler class is not null, the subManager method on its data manager is used, passing the ruler row as the second parameter (this will automatically set up the ruler list). Both these techniques pass along the connection information so that the newly created data manager has database access.

The passed dictionary is a row value dictionary, where the keys are key values (the vector of key values converted to string format). For each entry the key information in the key for the dictionary entry is converted back to a vector of strings (using the stringToVector method) and the is passed to the rowForKeys method on the data manager (EADPDataManager), which is used to find a matching row on the database (if there is none a new blank row is created). If a new row is created, the fullCompoundType method on EADPDAManager is used to find the column names and types (using database table metadata). Since this is an expensive call, the results are cached by row type in the interface controller.

The editors dictionary is also set up at this time, based on the type of the column. Next, the rowDictionary is used to update column values (using the setStringValue method on EADPPersistentObject, which uses the editorsDictionary property of the datamanager to find the right property editor for each column and convert the string value to object value using the property editor). The updates are applied to the database (this is done using the facilities of EADP internal processing so that any verifications that were specified during customization are invoked at this time). If no updating information was provided, and the row was not found, processing stops for this leg because the associated subobjects do not have a ruler. Also, if the apply failed because of errors, processing stops for this leg.

If processing can continue on this leg, the method iterates over the subobjectsDictionary attribute of the EADPInterface node. For each entry, the apply uses the key for the entry (the internal class name of the subobject), the value of the entry (a dictionary of EADPInterfaceNodes keyed by key values for the subobject) the application class for the data manager, and the row just processed.

3. EADPInterfaceBase

This class is the base macro class for interface macros and defines the macro (keyword, trailer, segment, dictionary, method).

4. EADPColumnInterface

This class was described during the explanation of processing of EADPInterfaceClass. It is used for the majority of column extraction processing.

5. EADPInterfaceFormat

This is the basic formatting class, and it defines the format: pattern: method. At this level, the method just returns the input string unchanged.

6. EADPTableType

This macro class is used to avoid placing the same internal class name in each keyword within a template. It stores the passed internal class name in a work area in the processDictionary, so it can be used as a default.

As mentioned above, the problem of handling text files, both for input and output, has been around for a long time, and there have been many attempts at tools. The drawback of most of them is that they are very restricted in the types of flies that they can process, and the customization schemes are very cumbersome. Also, these tools tend to be standalone. One major advantage of the tool disclosed herein (at least for EADP based applications) is that it ties in with the application logic already defined in EADP.

One of the most important characteristics of this solution is that it "inverts" the solution—the problems of pattern matching and flow of control are handled by creating a structure of templates and macros that correspond to the structure of the text file to be processed. This approach allows for a great deal of flexibility, and it breaks down the grand problem of processing the file into more manageable units.

Since pattern matching is done by duplicating the pattern of the text file within a template, it is easy to set up this part of the tool. Often, a sample of the text file can be used as a basis for the templates.

The macros are designed so that they can be reused for various templates.

Another advantage of this approach is that it can be extended and adapted to new situations. What this invention provides is the basic mechanism needed to invoke the templates and macros. The actual templates and macros needed for a particular file structure can be added as needed within the general context of the tool. Also, this invention does not require the introduction of a new procedural language within the tool to handle flow of control. All the macros are written in Java. So another advantage is that all procedural logic is written in a standard way. Also, enough information is passed to the macro classes so that they have full access to all the power o the EADP internal classes. This means that the macros can do quite a bit of processing if that is required.

The present invention has been implemented in the Enterprise Application Development Platform (EADP). The user manual for this facility is included herein a Appendix A.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of processing a text file used to communicate between a computer application and a user, the method comprising the steps:

describing a text format by using fragments of text from the text file for creating a plurality of templates, wherein each of the templates has literal fragments of the text file, and each of the templates includes substitution points;

when the format of the text file changes, changing the templates;

using macro classes to map data from the text file to the computer application;

embedding in each of the templates a call to one of the macro classes; and using the templates as overlays to parse the text file into segments having data, or as a prototype to generate a segment of an output file;

using an interaction of the templates and the macro classes to describe a flow of control to process the text file, including the steps of:

when reaching said call in one of the templates, using said call to invoke one of said macro classes, using said invoked macro class to process the text file, and said invoked macro class then invoking another one of the templates to further process the text file, whereby the templates and the macro class describe a flow of control of the processing of the text file; and wherein:

the macro classes include an input macro and an output macro; and the using said macro classes to map data from the test file to the computer application includes:

using the input macro to read in a segment of the text file and to use said read in segment to initiate update processing of the computer application; and using the output macro to derive data from the computer application and to format said derived data into the text file.

2. A method according to claim 1, further comprising the step of providing an interface controller to prevent structure clashes by placing text data into appropriate places in an object structure as the text file is processed.

3. A method according to claim 2, wherein the step of providing the interface controller includes the steps of:

using the interface controller to set up said object structure and to place said text data into said object structure as the text file is processed; and after the entire text file is processed, using said object structure to process updating data into said application.

4. A method according to claim 3, wherein:

the templates support variable substitutions and conditional or iterative generation for output files; and the method comprising the further steps of:

including in each template, calls to macros that specify points in an input stream from which data are to be taken and what to do with said data;

providing each template with an extraction point to extract data from the input stream, said each template including a name of at least one of a plurality of fields to be extracted and a name of at least one of a plurality of database tables, said at least one field belonging to in the computer application;

including in each template, parsing information that specifies, for each field, which of at least one of a plurality of internal classes the field is assigned to, and a database column name for the field; and providing an interface file to define an interface template for the computer application.

5. A method according to claim 1, wherein:

the step of using said call to invoke one of said macro classes includes the step of passing to said one macro class a name for said another template when said one macro class is invoked; and the step of using an interaction of the templates and the macro classes to describe a flow of control to process the text file, includes the step of said one macro class using said passed name to invoke said another template to further process the text file.

6. A method according to claim 1, comprising the further steps of:

using literal text within the templates to determine the format of an output stream; and storing the templates for the computer application as a hashtable.

7. The method according to claim 1, wherein:

each of the templates includes a keyword at one of the substitution points of the template; and said keyword includes the call to the one of the macro classes, and a name of said another one of the templates invoked by said one of the macro classes.

8. The method according to claim 1, wherein:

the text file has a structure inherently describing a sequence of processing needed to process the interface text file; and the templates and the macro classes comprise a nested aggregation and build a processing structure that mirrors said structure of the text file.

9. The method according to claim 1, wherein the using an interaction of the templates and the macro classes to describe a flow of control to process the text file includes reusing a same macro class to do different functions by passing said same macro class to different ones of the templates.

10. The method according to claim 1, wherein the using an interaction of the templates and the macro classes to describe a flow of control to process the text file includes keeping a cache of the macro classes that have been used to process the text file to avoid repeated calls to instantiate a same macro class.

11. The method according to claim 1, wherein the describing a text format by using fragments of text from the text file for creating a plurality of templates includes:

breaking the text file into records, including combining lines from the interface text file into logical records; and for each of the records, determining a matching one of the templates.

12. A processing system including a processing unit and a memory, for processing a text file used to communicate between a computer application and a user, the processing unit being configured for:

describing a text format by using fragments of text from the text file for creating a plurality of templates, wherein each of the templates has literal fragments of the text file, and each of the templates includes substitution points;

when the format of the text file changes, changing the templates;

using macro classes to map data from the text file to the computer application, wherein a call to one of the macro classes is embedded in each of the templates;

using the templates as overlays to parse the text file into segments having data, or as a prototype to generate a segment of an output file;

using an interaction of the templates and the macro classes to describe a flow of control to process the text file, by i) when reaching said call in said one of the templates, using said call to invoke one of said macros classes, ii) using said invoked macro class to process the text file, and iii) using the invoked macro class to invoke another one of the templates to further process the text file, whereby the templates and the macro classes describe a flow of control of the processing of the text file; and wherein:

the macro classes include an input macro and an output macro; and the using said macro classes to map data from the test file to the computer application includes:

using the input macro to read in a segment of the text file and to use said read in segment to initiate update processing of the computer application; and using the output macro to derive data from the computer application and to format said derived data into the text file.

13. A system according to claim 12, further comprising an interface controller to prevent structure clashes by placing text data into in an object structure as the text file is processed.

14. A system according to claim 12, wherein:

when said one of the macro classes is invoked, a name for said another template is passed to the invoked macro class from said one of the templates; and said invoked macro class uses said name to invoke said another template to further process the text file.

\* \* \* \* \*